United States Patent [19]

Hamaguchi

[11] Patent Number: 4,602,237
[45] Date of Patent: Jul. 22, 1986

[54] BALLAST RESISTOR DEVICE FOR USE IN A LASER SYSTEM
[75] Inventor: Iwao Hamaguchi, Yamato, Japan
[73] Assignee: Ricoh Company, Ltd., Tokyo, Japan
[21] Appl. No.: 648,055
[22] Filed: Sep. 6, 1984
[30] Foreign Application Priority Data
 Sep. 6, 1983 [JP] Japan ................... 58-163499
[51] Int. Cl.[4] ............ H01C 7/10; H01C 7/13
[52] U.S. Cl. ......................... 338/20; 338/21; 372/81
[58] Field of Search ............ 338/20, 21, 296, 301, 338/302, 229; 372/81, 23, 82, 35; 315/58, 71; 156/244.17

[56] References Cited
U.S. PATENT DOCUMENTS 3,310,766  5/1967  Downing et al. ............ 338/20
4,166,986  9/1979  Hundstad et al. .......... 372/35 X
4,287,484  9/1981  Wang et al. ................. 372/23
4,451,767  5/1984  Goralnik ................... 315/310 X
4,493,087  1/1985  Laakman et al. ........... 372/82 X
4,525,230  6/1985  Hetzel et al. ............... 338/20 X Primary Examiner—Clarence L. Albritton
Assistant Examiner—M. M. Lateef
Attorney, Agent, or Firm—Cooper, Dunham, Griffin & Moran

[57] ABSTRACT

A ballast resistor device for use in a gas laser system for stabilizing the operation of the gas laser includes a housing, a ballast resistor element and a filler material filled in the space between the housing and the resistor element is provided. In the preferred embodiment, the filler material is substantially high in dielectric breakdown strength as well as in thermal conductivity, so that the ballast resistor device of the present invention has a rigid structure providing a strong mechanical and electrical durability, not to mention an excellent heat dissipating characteristic thereby allowing to prevent the resistor element from being overheated.

10 Claims, 14 Drawing Figures 4,602,237

BALLAST RESISTOR DEVICE FOR USE IN A LASER SYSTEM

BACKGROUND OF THE INVENTION

1. Field of the Invention

This invention generally relates to a gas laser system and in particular to a ballast resistor device for use with a gas laser tube. More specifically, the present invention relates to improvements in electrical insulation and heat dissipation of a laser ballast resistor device.

2. Description of the Prior Art

A gas laser system is typically used as a light source in laser printers and video disc recorders. It is well known that the gas laser must be operated at constant current so as to obtain a stable laser output with less noise. Since the gas laser typically possesses the characteristic of negative resistance, it is common practice to provide a ballast resistor as connected in series with the gas laser tube in order to cancel this effect. If a gas laser having such a negative resistance characteristic were driven by a constant current source, an oscillation would be induced in the current source thereby making the operation unstable.

For example, a typical He-Ne laser of a few mW output class possesses the characteristics: discharging onset voltage of 10 kV or less, discharging voltage of 1 kV to 2 kV, discharging current of 5–5.5 mA and negative resistance of 30–70 k-ohms. A ballast resistor to be used with such a gas laser is required to have the following characteristics. (1) resistance value: 100 k-ohms (must be larger than the negative resistance of laser) (2) power consumption: 4–5 W (3,025 W if the discharging current is 5.5 mA and the resistance of ballast resistor is 100 k-ohms) (3) breakdown voltage: 10 kV or more (must be larger than discharging onset voltage)

In addition, such a ballast resistor must be disposed close to the anode of the gas laser tube so as to make the effects of parasitic capacitance of leads as small as possible and to stabilize the power source. Provision of the ballast resistor close to the anode of the laser tube then requires that the ballast resistor be high in breakdown voltage as well as high in heat dissipation. However, although prior art laser ballast resistors are electrically insulated sufficiently, they are not as high as desired in heat dissipation so that they have often been found to be damaged by heat. Stated more in detail in this respect with reference to FIG. 1, a typical prior art gas laser system includes a gas laser tube 3 provided with an anode pin 1 and a cathode pin 2 at each end as illustrated and a ballast resistor device 4 mounted on the peripheral surface of the gas laser tube 3 as located closer to the anode pin 1 as sealed in a glass tube 5. The anode pin 1, cathode pin 2 and ballast resistor 4 are connected in series, and such a series loop is further connected to a laser power source 6 typically comprised of DC/DC and AC/DC converters. In this manner, since the prior art ballast resistor device is fixedly mounted on the laser tube as sealed in the glass tube, a sufficient electrical insulation may be attained but it is relatively poor in the characteristic of heat dissipation thereby providing the probability of being damaged by heat accumulation.

SUMMARY OF THE INVENTION

It is therefore a primary object of the present invention to obviate the above-described disadvantages of the prior art and to provide an improved ballast resistor device for use in a laser system.

Another object of the present invention is to provide an improved ballast resistor device for use in a gas laser system, which is high in electrical insulation as well as in heat dissipation.

A further object of the present invention is to provide an improved ballast resistor device for use in a gas laser system, which is rigid in structure and easy to manufacture.

Other objects, advantages and novel features of the present invention will become apparent from the following detailed description of the invention when considered in conjunction with the accompanying drawings.

DESCRIPTION OF THE PREFERRED EMBODIMENTS

As will become more clear from a reading of the following description, a primary feature of the preferred embodiment of the present invention is to provide a ballast resistor device for use in a gas laser system, which comprises a ballast resistor element provided in a housing as embedded in a filler, which is high in electrical insulation as well as thermal conductivity, with the ballast resistor device fixedly attached to the gas laser tube in surface contact therewith.

Figure 1:
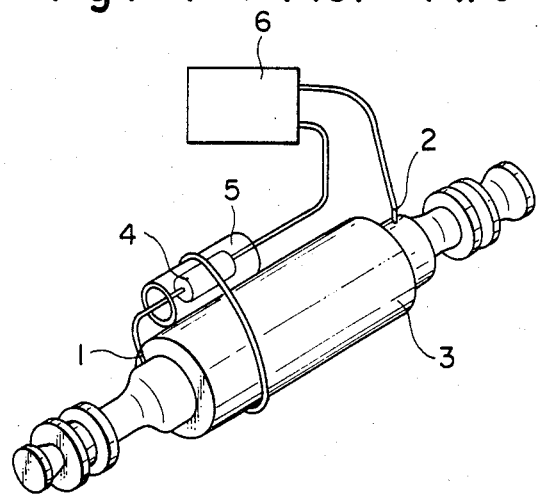
FIG. 1 is a perspective view showing a typical prior art gas laser system with a ballast resistor device.
Figure 3:
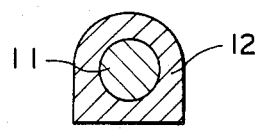
FIG. 3 is a transverse, cross-sectional view of the ballast resistor device shown in FIG. 2.
Figure 2:
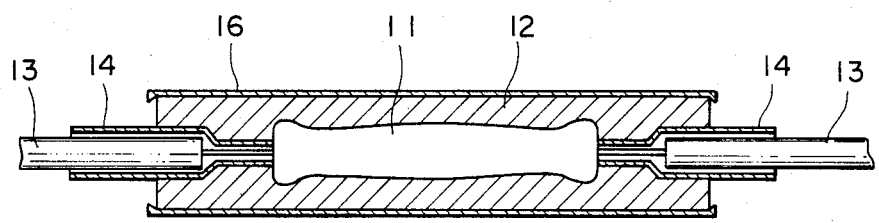
FIG. 2 is a longitudinal, cross-sectional view showing a ballast resistor device for use in a laser system constructed in accordance with one embodiment of the present invention.

Referring now to FIGS. 2 and 3, there is shown a ballast resistor device for use in a gas laser system constructed in accordance with one embodiment of the present invention. As shown, the ballast resistor device includes a ballast resistor element 11 provided as embedded in a filler 12 having predetermined properties. For example, the resistor element 11 may be fabricated from a cermet resistor by having it printed on a ceramic substrate and, after baking, providing a helical groove thereon. The preferred material for the filler 12 includes silicon rubber, which is typically used as a high-voltage resistant filler for use in electronic components, and insulating varnish. For example, 2-fluid RTV rubber (silicon rubber) of KE 1204 LTV, available from Shinetsu Chemical Industries, Inc., has the properties of dielectric breakdown strength of 27 kV/mm and thermal conductivity of $7.2 \times 10^{-4}$ cal/cm.sec.° C. and thus it is appropriate as a filler to be used in the present invention. That is, a candidate for the filler material for use in the present invention requires to be high in dielectric breakdown and excellent in thermal conductivity.

From each end of the ballast resistor element 11 extends a high-voltage cable 13 as connected from a corresponding lead of the element 11. The ballast resistor device also includes a pair of high-voltage resistant and thermally shrinkable tubes 14, 14 as extending from the ends of the element 11 over a predetermined length thereby having the leads and the end portions of the cables 13, 13 enclosed therein, respectively. In the illustrated embodiment, the tubes 14, 14 are provided as partly embedded in the filler 12 and partly projected from both ends of the filler 12. It is to be noted that the tubes 14, 14 are used to increase the creeping distance from the connectiong portion between the resistor element 11 and each of the high-voltage cables 13, 13 to a metal portion of a gas laser tube on which the present device is fixedly mounted.

Figure 4:
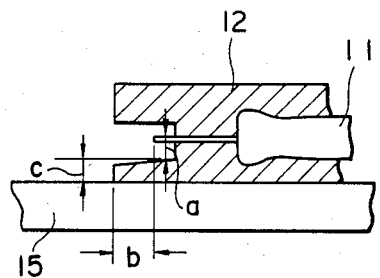
FIG. 4 is a schematic illustration showing also part of the ballast resistor device of FIG. 2 with its tubes removed, which is useful for explaining the length of a creeping distance from a connecting portion between the ballast resistor device and a high voltage cable to a metal portion on which the ballast resistor device is supported.
Figure 5:
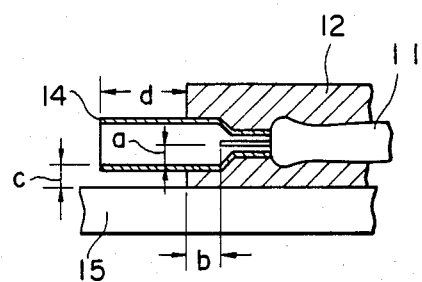
FIG. 5 is a schematic illustration similar to FIG. 4 but with tube 14 provided to increase the creeping distance.

Described more in detail with reference to FIGS. 4 and 5 in this respect, FIG. 4 shows the case in which the high voltage cables 13, 13 are removed and the tubes 14, 14 are not provided, so that the creeping distance from the connecting portion between the ballast resistor element and the high voltage cable to the metal portion 15 under the condition becomes $a+b+c$. On the other hand, in the case where the tubes 14, 14 are provided as shown in FIG. 5, the corresponding creeping distance becomes $a+b+c$ added with a distance d determined by the amount of projection of the tube 14 beyond the filler 12, so that a sufficient creeping distance may be secured even if the high voltage cable 13 is pulled off for some reason thereby increasing reliability in electrical insulation. It is to be noted, however, that provision of tubes 14, 14 is not necessary if the creeping distance defined by $a+b+c$ is sufficient in the structure of FIG. 4.

The ballast resistor device further includes a housing or case 16 for generally enclosing the filler 12. The housing 16 may, for example, be comprised of a thermally shrinkable tube of a material, such as polyphenylene oxide. The silicon rubber to be used as the filler 12 is susceptible to scratch, and once scratched, cracks are produced easily thereby reducing the effective creeping distance and deteriorating the dielectric breakdown. On the other hand, with the provision of the housing 16 in accordance with the present invention, even if cracks are produced in the filler 12, there will be brought about no disadvantages, such as a reduction in creeping distance and a deterioration in dielectric breakdown, and thus reliability is enhanced. In the preferred embodiment as shown in FIG. 3, the filler 12 and thus the housing 16 also is so formed to have a flat surface extending along the longitudinal direction of the device. Provision of such a flat surface is advantageous because the device may be stably held on the gas laser tube with its flat surface in contact with a metal portion of the tube. In addition to stability in mounting, such a structure is also advantageous in increasing heat dissipation for causing heat produced by the ballast resistor element 11 to be dissipated to the metal portion of the gas laser tube through the surface contact therebetween. It is to be noted that such a mating surface portion does not need to be flat and it may be curved as long as such a mating surface is in compliance with the configuration of the mounting portion defining a heat sink.

Figure 6:
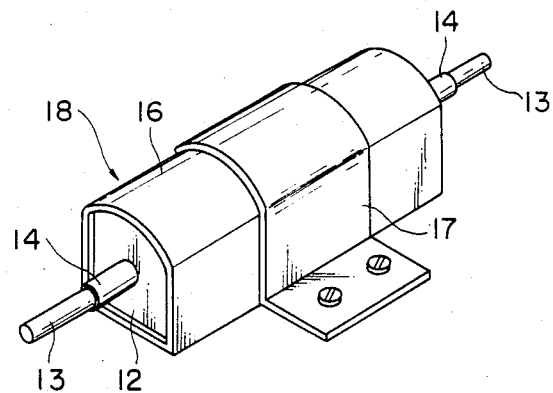
FIG. 6 is a perspective view showing one example of mounting the present ballast resistor device on a stationary object, such as a laser unit.
Figure 7:
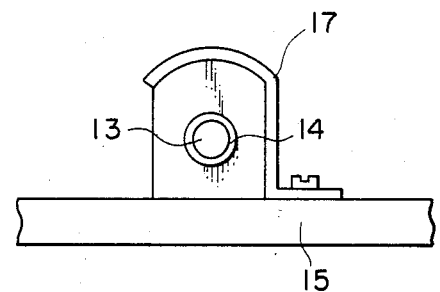
FIG. 7 is a side-elevational view of the structure shown in Fig, 6.

FIGS. 6 and 7 illustrate one way of mounting the present ballast resistor device 18 on a gas laser tube, in particular, on a metal portion 15 thereof. In the illustrated embodiment, the ballast resistor device 18 including the ballast resistor element 11 embedded in the filler 12 which in turn is enclosed in the housing 16 is placed on the metal plate 15 of the gas laser tube with its flat mating surface in contact with the plate 15. A clamp member 17 has a shape generally in compliance with the outer configuration of the ballast resistor device 18 and a bent section which may be fixedly attached to the metal plate 15 by means of screws. Thus, with the clamp member 17 fixedly attached to the metal plate 15, the ballast resistor device 18 is fixedly mounted on the metal plate 15. As described briefly, with such a structure, the ballast resistor device 18 may be easily mounted on the metal plate 15, which also serves as a heat sink, and a surface contact between the device 18 and the metal plate 15 may be established thereby allowing to enhance dissipation of heat from the device 18 through conduction. By constructing the clamp member 17 from a material having resiliency in a shape generally in compliance with the outer configuration of the device 18 and slightly smaller in size, when the clamp member 17 holding the device 18 therein is fixedly attached to the metal plate 15 by means of screws, the device 18 comes to be pressed against the plate 15 with its flat mating surface in contact therewith, which also allows to further enhance conduction or drainage of heat from the device 18 to the metal plate 15.

Figure 8:
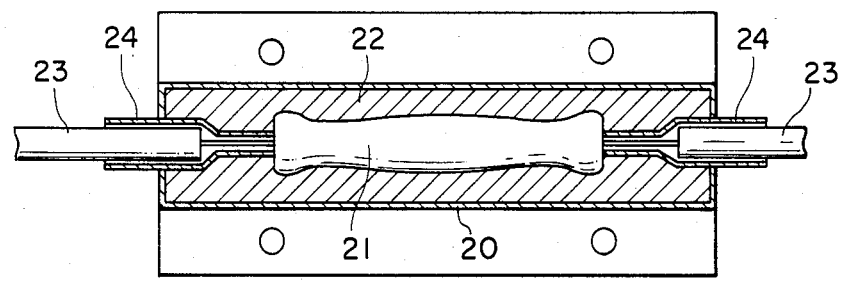
FIG. 8 is a longitudinal, cross-sectional view showing another embodiment of the present invention.
Figure 9:
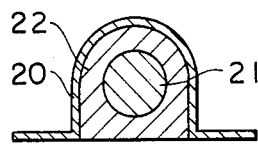
FIG. 9 is a transverse, cross-sectional view of the device shown in FIG. 8.
Figure 11:
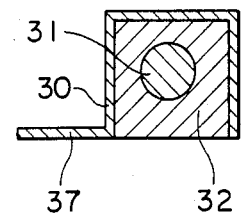
FIG. 11 is a transverse, cross-sectional view of the device shown in FIG. 10.
Figure 10:
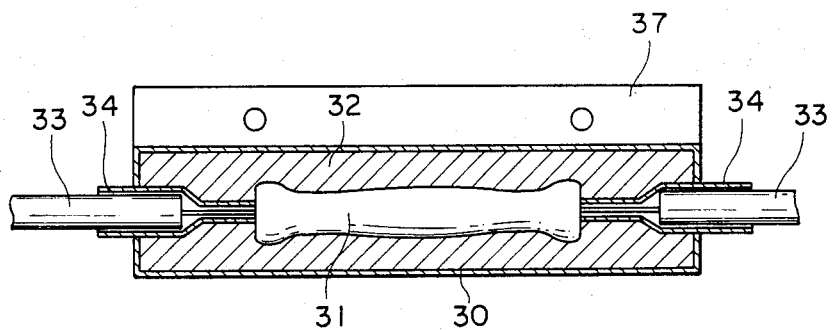
FIG. 10 is a longitudinal, cross-sectional view showing a further embodiment of the present invention.

FIGS. 8 and 9 illustrate another embodiment of the present invention, in which the ballast resistor device includes a housing 20 formed in the shape of an inverted omega in cross section from a heat-resistance resin material as mentioned earlier. The housing 20 is generally in the form of a tunnel and it partly encloses a filler 22 of silicon rubber or the like, which, in turn, encloses a ballast resistor element 21 therein. The ballast resistor element 21 has a pair of leads as extending from both ends thereof, each of which pair of leads is connected to a high-voltage cable 23. An end tube 24 is provided at each end of the filler section 22 to have the corresponding lead and the end portion of the corresponding high-voltage cable 23 enclosed. The housing 20 has a pair of bent sections which may be used to have the housing 20 and thus the device as a whole fixedly attached to the metal plate 15. In this embodiment also, the filler section 22 is so shaped to have a flat mating surface which may be brought into contact with the supporting plate 15 when mounted.

FIGS. 10 through 13 show another embodiment of the present invention. Also in this embodiment, the ballast resistor device includes a housing 30, made from a heat-resistant resin material generally in the form of a longitudinal box, a ballast resistor element 31 placed inside of the box-shaped housing 30 and a filler 32 filled in the space between the housing 30 and the resistor element 31 to have the resistor element 31 fixed in position. As different from the previous embodiments, the box-shaped housing 30 is provided with a pair of support ribs 35, 35 spaced apart from each other in the longitudinal direction of the device. Such a structure is particularly advantageous from the viewpoint of manufacture because the resistor element 31 may be properly placed in position before and during filling of the filler 32. The housing 30 is provided with a bent section 37 which may be used for having the present device fixedly mounted on the mounting plate 15. Similarly with the previous embodiments, the ballast resistor element 31 is provided with a pair of leads on both ends, each of which is connected to a corresponding one of high-voltage cables 33, 33.

Figure 12:
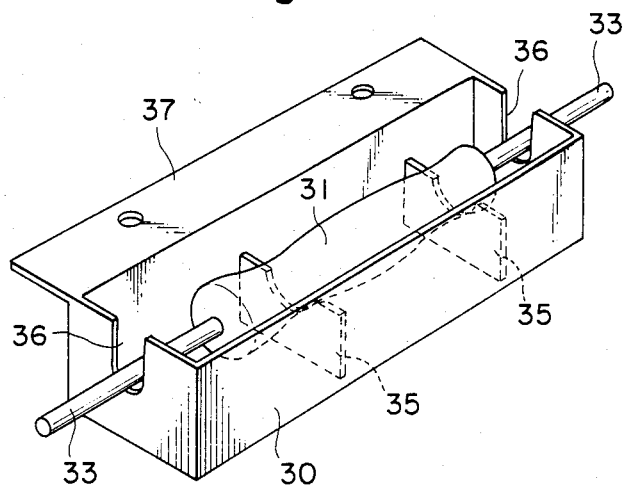
FIG. 12 is a perspective view showing the ballast resistor device shown in FIGS. 10 and 11 before providing a filler.
Figure 13:
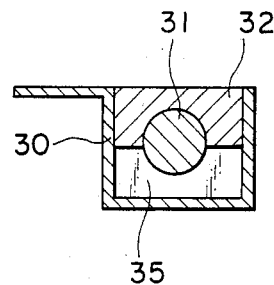
FIG. 13 is a transverse, cross-sectional view of the device shown in FIG. 10 taken at a different location along the longitudinal direction from the one for FIG. 11.

Furthermore, the ballast resistor device of this embodiment also includes a pair of end tubes, one at each end of the element 31, each of which is provided as partly embedded in the filler section 32 to have the corresponding lead and the end portion of the corresponding high-voltage cable 33 enclosed. As shown in FIG. 12, the box-shaped housing 30 is also provided with a pair of notches 36, 36, one at each end of the box 30 and the high-voltage cables 33, 33 may be fitted into the respective notches 36, 36 when the resistor element 31 is placed in position. It should be understood that the notches 36, 36 with the cables 33 fitted therein are plugged by a suitable cover during filling of a filler material into the box-shaped housing 30.

In either of the embodiments illustrated in FIGS. 8 and 9 and FIGS. 10-13, since the device may be fabricated by preparing a preformed housing having a desired shape from a heat-resistant resin material, placing a ballast resistor element in position inside of the housing and pouring a filler material into the housing, it may be manufactured with ease and adapted for mass production. Besides, the opening of the housing 20, 30 may be defined to be relatively large to ease pouring of a filler material into the housing, which also allows to define a relatively large flat mating surface which is to be brought into contact with the mounting plate 15 thereby permitting to increase the rate of heat dissipation.

Figure 14:
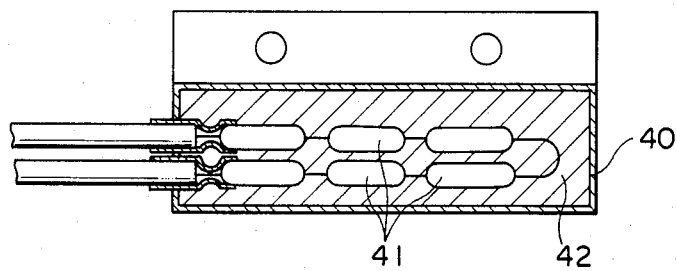
FIG. 14 is a longitudinal cross-sectional view showing a still further embodiment of the present invention in which a plurality of ballast resistor elements are provided as series connected.

FIG. 14 shows a still further embodiment of the present invention, in which a plurality of ballast resistor elements 41 are provided as connected in series and placed inside of a housing 40 as embedded in a filler 42 filled in the housing 40. Such a structure is advantaged in that the voltage sustained by a single ballast resistor element 41 may be made smaller, so that the scope of selection of a material for the resistor element 41 may be broadened. Besides, since the voltage sustained by each of the resistor elements 41 is smaller, the total amount of heat generation may be reduced.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A ballast resistor device for use in a laser system, comprising:
   a housing of a predetermined shape;
   a ballast resistor element placed within a space defined by said housing and having a pair of leads, each connectable to a cable for connection to circuitry in said laser system;
   a filler material filled in the space between said housing and said ballast resistor element thereby having at least said ballast resistor element embedded in said filler material; and
   means for fixing an assembly of said housing, ballast resistor and filler material to a mounting member in said laser system.

2. The device of claim 1 further comprising a pair of end tubes, each of which is placed to enclose therein the corresponding one of said leads and an end portion of said cable connected to said corresponding lead.

3. The device of claim 2 wherein each of said pair of end tubes is long enough to project out of said filler material over a predetermined distance to secure a sufficient creeping distance.

4. The device of claim 2 wherein said laser system includes a gas laser tube and said mounting member is a metal plate positioned on a peripheral surface of said gas laser tube.

5. The device of claim 4 wherein said filler material is substantially high in dielectric breakdown strength as well as in electrical conductivity.

6. The device of claim 5 wherein said filler material has a flat surface formed when filled and solidified in the space between said housing and ballast resistor element with said flat surface positioned opposite to said metal plate when fixedly mounted thereon.

7. The device of claim 6 wherein said fixing means includes a clamp member including a clamping section having a shape generally in compliance with an outer contour of said housing and a fixing section integral with and bent from said clamping section, said fixing section being fixedly attached to said metal plate by means of screws thereby causing said clamping section to have said assembly pressed against said metal plate.

8. The device of claim 6 wherein said fixing means includes a portion of said housing, said portion being fixedly attached to said metal plate by means of screws.

9. The device of claim 6 further comprising at least one support member positioned inside of said housing thereby supporting said ballast resistor element in position inside of said housing.

10. The device of claim 1 further comprising a plurality of said ballast resistor elements connected in series and embedded in said filler material.

* * * * *